March 21, 1944. P. LANHAM 2,344,512

FLUID METER

Filed Dec. 15, 1939 3 Sheets-Sheet 1

Patented Mar. 21, 1944

2,344,512

UNITED STATES PATENT OFFICE 2,344,512

FLUID METER

Paul Lanham, Lanham, Md.

Application December 15, 1939, Serial No. 309,486

35 Claims. (Cl. 73—205)

This invention relates to meters and more particularly to improvements in meters relating to measurements with respect to fluid flow whereby various fluid flow rates and quantities may be indicated and recorded as well as integrated and transmitted with a high degree of precision. The instant application is thus directed to equipment similar in some respects to that shown and claimed in my Patent No. 1,951,797 of March 20, 1934, and others but more especially improvements, variations and simplifications whereby such precision measurements may be obtained.

In previous meters heretofore employed for measuring fluid flow, pressures, differential pressures and the like, the use of mercury levels or columns with indicating devices responsive to variations in mercury levels has resulted in certain inherent difficulties and inaccuracies when a contact member (mechanical or electrical) is used to detect the mercury level although such contact methods have resulted in a higher degree of accuracy than other methods. Whether the measurement is indicated at the time of contacting the mercury surface (closing of an electric circuit), or at the time the contact leaves the mercury surface (breaking of the electric circuit), deformation of the mercury surface, temperature variations causing variation of the meter parts with respect to each other as well as other factors, all contribute to prevent the obtaining of precision measurements. Metering by square root cams and by versed sine methods have been attempted employing modifying means in order to secure measurements of quantities which vary as the square root of another quantity in order to approach the true square root or parabolic measurements; such meters not only require corrective means but require very complicated mechanisms in order to approach measurements in a low order of precision.

The primary object of this invention therefore is to provide a new simplified type of meter which will overcome the aforementioned difficulties and will give measurements throughout the entire range of the instrument with a high degree of precision. The extremely high degree of precision measurements obtained by meters in accordance with my present invention is dependent upon the cooperation of several factors in order to overcome the difficulties mentioned, among which may be mentioned;

An improved precision contact to read on break instead of make. This consists of a contact tip which is constantly coated, plated or impregnated with material of the electrically conductive fluid with which the contact cooperates. With a mercury column, the addition of a contact element having an amalgamated contact tip has been found to give an unexpectedly high degree of precision rendering accurate and consistent measurements of variations of mercury levels of extremely small magnitude, in the order of $\frac{1}{10000}$ inch and less in lower ranges of the instrument and naturally of a consistently high degree of precision in the upper ranges. Fouling of the conductive fluid column and/or constantly coated contact tip is prevented by maintaining a preservative fluid over the conductive fluid column,—for a mercury column and a cooperating amalgamated contact tip I have found that glycerine, chloroform, methyl salicylate and other fluids having the property of preserving and protecting mercury and amalgamated contacts operate as a sealing means with a high degree of satisfaction.

Improvement of the return of the electrically conductive fluid column to zero or the correct level responsive to the quantity being measured. In mercury columns which fluctuate due to varying forces which are being measured there are certain lags in the return of the mercury to the corresponding levels; on a rising column of mercury the meniscus is different from that on a falling column. Numerous other defects with respect to this conductive column which introduce errors which are detrimental in precision metering are corrected in accordance with my invention by improving the consistency of the column and the meniscus of the measuring level of the mercury as will be more fully set forth hereinafter. In measuring with a break contact inconsistencies due to lag and variations in the meniscus are further overcome by always breaking contact with a falling column by securing a plunger or mercury displacer to the contact rod so as to effect by its withdrawal with the contact tip, a falling of the mercury column at the time of the break of contact therewith. During the taking of a measurement this plunger may be made to lock the mercury against movement in the measuring column and range tube to prevent surges of the mercury at the instant the circuit is broken at the contact tip. Further variations in mercury levels due to expansion and contraction by temperature variations of the meter elements and the electrically conductive fluid column and its relation with respect to other elements of the instrument are compensated for by a temperature compensating device positioned preferably on the contact carrying rod adjacent to the electrically conductive column.

An improved method and arrangement for extraction of the square root of the differentials in height of the fluid column whereby, in taking flow measurements, permitting flow indications to be proportional to the flow instead of to the square of the flow. While this has been attempted with some degree of accuracy with cams and by versed sine means, the latter requires corrective means, and both of these methods are not susceptible of precision construction as they are dependent upon such corrective means as to complicate their construction and they still fail to produce precision measurements. In accordance with the present invention these faults have been overcome by providing a pair of cooperating levers (or their equivalents) for driving the contact element, or otherwise to be driven in accordance with the position of the contact or mercury level responsive means, which levers are so proportioned as to extract the square root with precision throughout the range of the instrument. These levers at the same time provide means for changing over from the rectilinear movement of the mercury to the oscillatory movement which is convenient for recording and integrating meters.

Meters incorporating these improvements have the advantage of producing precision measurements at the same time employing fluid columns of small cross-sectional areas and with small movements of the fluid columns thus requiring only a small quantity of mercury.

Further objects, details and advantages of the invention and methods of operation will be more fully set forth in the following specification in conjunction with the accompanying drawings and claims hereinafter.

In the drawings:

Figure 8 is a detail view of a float with a mercury well adapted to be carried on mercury, oil or other fluid which may be employed to respond to quantity variations, which float is adapted for cooperation with a contact rod and meter as shown in Figure 1.

Referring to the drawings the meter in accordance with this invention in general comprises a detector contact member which detects the movements of a fluid 2 the movements of which are responsive to variations in quantities to be measured, more particularly to pressures and/or flow of liquid of gaseous fluids. Contact member comprises a reciprocable contact rod 1, the upper end 3 of which is connected with operating mechanism 4 for reciprocably driving the contact member and operating a pen arm 5 so as to record on a driven chart 6 the desired function of the movement of fluid 2, in flow measurements extracting the square-root of the rises in height of fluid 2 so that the degree to which the recording pen is moved and a record made thereby is directly proportional to the flow instead of the square of the flow, or logarithmic. While the pen arm may be arranged for lineal or fine line recording if desired, as disclosed in some of my previous patents, 1,326,747 of December 30, 1919, and 1,935,508 of November 14, 1933, for example, an ordinate plotting arrangement operating at timed intervals has the advantage that the pen arm moving means is adapted to operate an integrator directly and also when this pen arm moving means is operated to produce an ordinate timed in proportion to the flow the meter is particularly adapted as a transmitter for telemetering.

Figures 1, 5, 6:
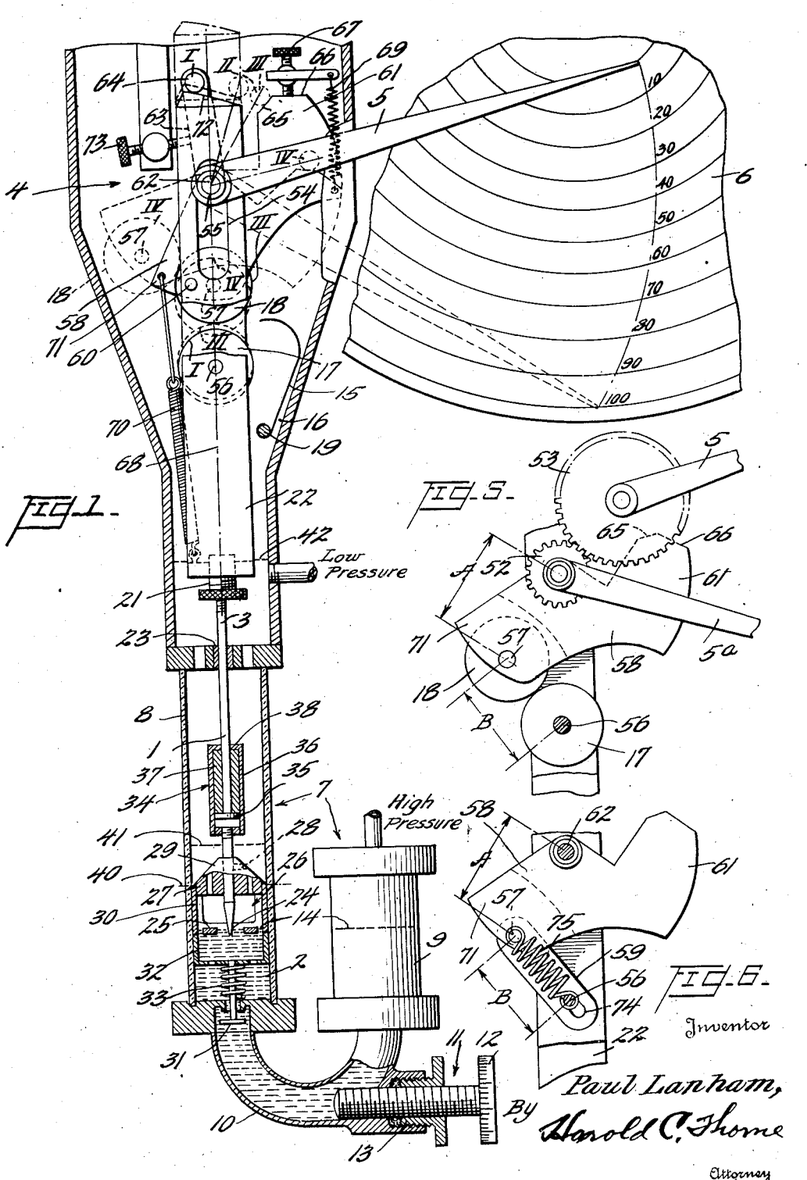
Figure 1 is a diagrammatic vertical sectional view of a meter in accordance with the invention.
Figure 5 is a detail diagram of the operating levers illustrated in Figure 1 showing the members in an intermediate position and a geared driving connection between the operating levers of the meter and an indicator or recording pen arm thereof.
Figure 6 is a detail diagram of operating levers in the same relative position as illustrated in Figure 5 but showing an equivalent lever in connection with a link connection instead of a pair of engaging rollers providing the connection.
Figures 2, 3, 4, 5, 9:
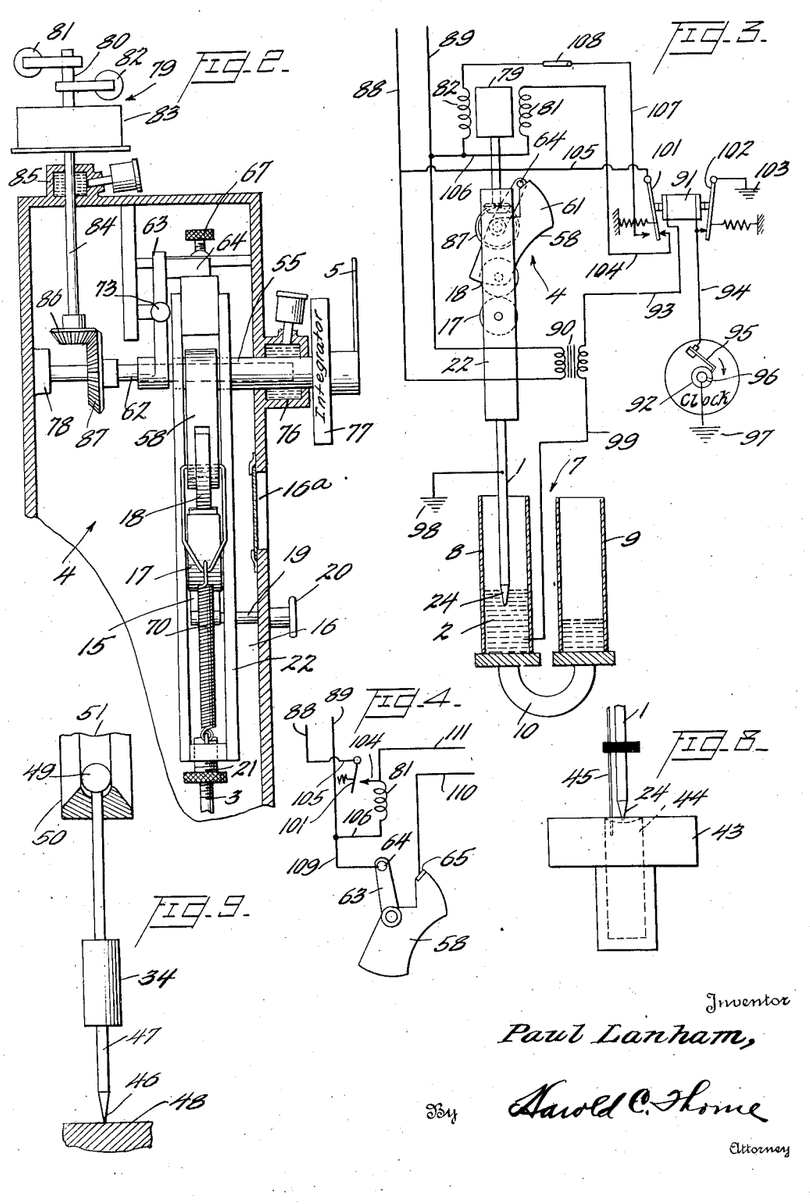
Figure 2 is a vertical sectional view of the meter showing the left side of the operating mechanism illustrated in Figure 1.
Figure 3 is a wiring diagram of the control circuits of the meter.
Figure 4 is a supplemental wiring diagram illustrating a manner of employing the meter as a transmitter for telemetering.
Figure 9 is a detail view of a modified type of contact rod and its connection with the operating mechanism.

The organization of the meter as arranged for recording spaced ordinates which may be of timed duration and are of a length directly proportional to the flow, or quantity, to be measured, is best illustrated in Figures 1, 2 and 3, and since its precision and accuracy are dependent upon the accuracy in the detection of variations in levels of fluid 2 by contact member 1 details with respect thereto will be fully set forth.

In order to measure differential pressures fluid 2, mercury, oil or any other desired fluid, preferably mercury which is an electrically conductive fluid and has been most practical in measuring water, steam and other fluids, is placed in a manometer 7 comprising a contact chamber or measuring tube 8, and a range tube 9 which is of a selected or exchangeable size whereby the percentage of mercury movement affecting registration of the meter may be varied to suit the installation. Each of these tubes is of uniform cross-section for use with operating mechanism 4 for extracting the square root of rises in height of the mercury; they may be of equal size, or for low flow measurements a higher percentage in the contact side is desirable, whereas for a high flow a smaller percentage in the contact side is necessary, as is recognized in flow metering practice. Manometer 7 is provided with differential pressure connection pipes indicated as "High pressure" connected with range tube 9 and the pipe "Low pressure" communicates with measuring tube 8, being connected with a meter housing comprising a pressure chamber 18.

In describing the meter, a one inch rise of mercury or other fluid 2 in the contact tube 8 for a 100% range on chart 6 corresponds with the figures and measurements set forth, although other mercury heights are employed with the proper corresponding proportional measurements as will be explained.

Tubes 8 and 9 communicate by means of an improved connection pipe 10, and among other improvements in this manometer is a fluid level adjuster 11 comprising an external adjustable set screw 12 having a fluid tight packing 13 which for convenience is positioned in connection pipe 10; this set screw is of sufficient size and is adjustable in and out so as to adjust the level of fluid 2 for proper cooperation with the contact member 1, the mercury level detector which is connected with the operating mechanism 4 of the meter.

In making this adjustment, the zero level of the mercury (that is when the pressures on the two sides of the manometer are equal), can be made so as to bring the mercury to the required level in the instrument as indicated at 14 in the contact tube 8, or the adjustment or initial calibration may be made at any desired percentage of range. For example, under such a balanced condition of pressures in the manometer, an artificial deflection of 5% or 10% of range by the pen arm or indicator may be produced by giving the contact member an artificial added length of .0025" or .01" which is identical in effect to raising the mercury level by the same amounts respectively. While adjustable fluid displacer 11 may be calibrated as a micrometer to indicate differential adjustments of the mercury level (for a given ratio of range tube 9 size to that of the measuring tube 8) for the proper level at zero, or any other range of the meter, since the set screw 12 is operable to change the level of fluid 2 sufficient for adjustment purposes by infinitesimal amounts, due to variations in the tube ratios and other factors, the artificial added length which may be given to contact rod 1 facilitates the calibration and is more satisfactory in creating such an artificial deflection. If the deflection were created by the adjustable displacer, it would be essential afterwards to actually change the fluid level again by means of set screw 11 to bring the mercury back to the corresponding level instead of merely removing a calibrating shim.

As will be set forth, the meter is arranged to give the contact member an adjustable plunge ranging up to about ⅛" below the zero level. The added length for calibration purposes is conveniently accomplished by means of shim 15 having the required thickness to produce such a calibration deflection. When the operating mechanism 4 is mounted within the pressure chamber 16 this shim 15 is so positioned within the casing that it may be inserted between roller members 17 and 18 of the operating mechanism while they are separated during the below zero plunge, and thus the zero level of the mercury may be adjusted so that the pen arm or indicator will show the percentage deflection represented by the thickness of the shim. The thickness of the shim must be accurate or necessary tolerances in the deflection made to account for any variations from the required thickness since a flow only sufficient to raise the level of fluid 2, .0001" corresponds to a 1% scale deflection. Shim 15 is connected with shaft 19 which in turn is operated by means of a handle 20 on the outside of casing 16 for inserting it between the rollers and withdrawing it. To facilitate in making adjustments, the pressure chamber may be of transparent material in the zone of operating mechanism 4 but as shown in Figure 2 an inspection hole with a transparent cover member 16a is provided for inspecting the lever mechanism while in operation. This is located where it will be of greatest value for adjustment, as at zero or any desired percentage of range.

In setting up the meter initial adjustments of the contact rod 1 may be made in the connection of its upper end 3 with the meter operating mechanism 4. This connection comprises a differentially threaded hollow screw 21 having a set of internal threads which receive the threaded upper end 3 of contact rod 1 and an external set of threads of a different pitch from said internal threads, which external threads screw into the lower end of the contact raising and lowering elongate frame 22 of the operating mechanism 4. It will be noted that contact rod 1 extends through a guide 23 which may be a stuffing box in the event the operating mechanism 4 is not encased in a pressure chamber and in the absence of the casing 16 this connecting screw provides a highly satisfactory means for adjusting contact rod 1 so that its tip 24 is at the zero or other range level of fluid 2 although both adjustments in cooperation with each other are of material aid in setting up the instrument for operation.

For precision in the operation of the meter the zero level is highly important but in the use of mercury particularly other factors have to be considered. The tube of the contact chamber 8 is preferably made of glass or other non-deformable insulating material and in practice a measuring tube having a bore of 1⅛" diameter and 4" long is suitable in a meter having the proportions as herein particularly described. Mercury in this chamber rises from the zero level in response to pressure differentials and falls correspondingly in the range chamber 9. Range tube 9 and connection pipe 10 are made of metal internally amalgamated; for this purpose copper has been found satisfactory, the amalgam penetrates to a slight depth but does not destroy the copper tube. Mercury in the manometer bonds with the amalgamated metal surfaces and excludes fluids above the mercury in the range tube from being trapped and thereby displacing mercury (which is highly important particularly at lower ranges of the meter). The amalgamated passageway also stabilizes the meniscus form, minimizing meniscus differences on rising and falling columns.

The meniscus form in the measuring chamber 8 is further improved by means of an amalgamated float 25 which functions to flatten and stabilize the mercury meniscus. For this purpose the float consists of a small thin annular member amalgamated on its bottom, bore and outer side walls, but not on its upper surface which may be covered with a protective coating such as lacquer or any suitable non-amalgamable material. This float rides centrally on the mercury column and its bore provides a passageway through which contact rod 1 and tip 24 will pass freely. Besides being maintained centrally by the mercury meniscus this amalgamater float has been found to bond with the mercury and follow the mercury accurately so as to maintain a uniform meniscus. The amalgamated float, as illustrated on an enlarged scale in Figure 7, has the property of changing the meniscus form, between the float and the container tube the mercury hugs the tube more closely forming a double or reverse curve, downward around the walls of the glass tube surface and upward around the protruding outer wall of the float, while in the center the mercury surface is maintained in a slightly depressed level which is uniform under all operating conditions of the meter.

Further in order to avoid mercury level variations due to changes of the meniscus on rising and falling columns contact rod 1 is provided with a displacer 26 comprising a perforated support 27 secured on contact rod 1 in a suitable manner such as a set screw 28. This support may be of metal, hard rubber, "Bakelite" or other suitable material and is formed with a sloping or conical upper wall 29 whereby fluids will not be retained thereby. As a displacing element a thin walled tube 30 secured to support 29 and having a strainless fit in the glass measuring tube 8 has proven satisfactory although this form is obviously susceptible to modification. Tube 30 extends from support at least the length of the maximum mercury elevations and has the greater portion of its side walls cut away above its bottom edge so as to provide substantially a displacer ring supported by upwardly extending fins; with such a structure the falling of the mercury level takes place substantially at the time the ring portion is withdrawn from the mercury column. The displacer is mounted on contact rod 1 so that contact tip 24 is substantially in the plane of the lower edge of the displacer and thereby the displacer co-functions with the contact tip mounting to effect a recession or falling of the liquid level just prior to or during the withdrawal of contact tip 24 from the mrecury, fluid 2.

In order to prevent surges of the fluid column as may occur when the quantity being measured is rapidly fluctuating, a self closing valve 31 is provided in the bottom of measuring tube 8 which closes during the taking of measurements and opens subsequent to the completion of measuring strokes. This valve coacts with contact rod 1, a perforated operating cup 32 being shown with its upper edges for engagement by the displacer element 30 for depressing the valve to open position at the time contact rod is at the lower portion of its downward stroke. As the contact rod 1 rises on its upward movement toward the zero level of the mercury valve 31 gradually approaches closed position so that when contact tip 24 reaches the zero level the valve is closed by its operating spring 33 sufficiently to prevent surges in the mercury columns in tubes 8 and 9 of the manometer.

Thermal expansion and contraction of the mercury and other meter parts is compensated for by means of a compensating element 34 as a part of the contact tip driving member, contact rod 1, and tip 24 to raise and lower the contact tip in consonance with the rise and fall of the mercury and other changes in adjustments due to expansion and contraction produced by temperature; it is preferably close to the mercury so as to receive the same effects. A satisfactory construction of this compensator consists in forming one section of rod 1 with a terminal collar 35 and the other section with a sleeve 36 enveloping an elongated member such as a tube 37 having a relatively higher coefficient of thermal expansion as compared with the other elements including rod 1, part of which it engages. An inwardly extending shoulder 38 at the end of the sleeve encloses member 37 and maintains the parts assembled.

Figure 7:
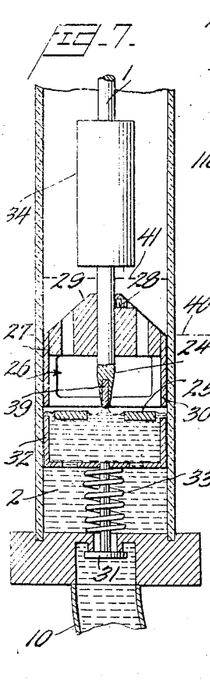
Figure 7 is an enlarged detail view of a portion of the contact chamber showing the relation of elements therein adjacent to the mercury surface just prior to the breaking of contact with the detector members.

For precision measurements with respect to such an improved arrangement for obtaining accurate mercury levels it is essential to have a detector element which will operate with precision. The usual forms of contact points have proven unsatisfactory in measuring break contacts. In accordance with this invention, therefore, contact rod 1 is provided with an amalgamated contact tip 24. As best shown in Figure 7 this tip is formed for convenience by inserting a small diameter rod or wire of amalgamable material 39 in a member, rod 1, of non-amalgamable material or otherwise supporting and shielding the amalgamable material so that the surface exposed to the mercury is thereby controlled as to length and diameter (or area) for best results. It is preferable to amalgamate and expose to the mercury only the lower surface.

Good results have been obtained using an insert $\frac{1}{16}$" in diameter slightly rounded at the tip and practically flush with a stainless steel shielding. Hard rubber and "Bakelite" have also been found effective as shielding. As shown, the shielding constituting the lower part of rod 1, is of tapered formation surrounding the insert and is conveniently formed of $\frac{1}{8}$" diameter rod material. In breaking contact with the surface of the mercury column, as shown, in Figure 7 the mercury has a tendency to cling to the amalgamated insert until it actually breaks, and this break always occurs at the same elevation above the mercury surface for the same amalgamated contact tip.

Heretofore contacts with the mercury have been made under water but precision detection of the mercury, fluid 2, levels by break contacts are obtained in the manner above explained and in accordance with my discoveries such detection of the differential levels is possible with accuracy heretofore unknown. Even though very small currents are employed in connection with such contacts with mercury under water, water electrolizes, mercury oxidizes and even an amalgamated contact tip oxidizes; salts in water are deposited so that the mercury and contact tip become fouled and corroded, and such defect results in erratic indications or recordings. Similarly it has been found that if transformer or like oil is used, a black deposit forms, possibly due to carbonization of oil caused by spark. On the contrary, however, I have discovered that glycerine (which is heavier than water) prevents such fouling due to oxidization and carbonization; chloroform and methyl salicylate are also found to be advantageous in protecting mercury and amalgamated surfaces since they are heavier than and do not mix with water and have inherent physical, chemical or electrical properties of benefit.

In employing the meter for measuring water flow, as shown in Figure 1, glycerine which is found preferable of the various fluids mentioned, is placed over the mercury to a depth slightly in excess of the maximum mercury rise in measuring tube 8, as indicated from mercury level 14 to the level 40, to ride on the mercury as it rises and falls in the tube. An intermediate fluid over the glycerine and under the water, as indicated between levels 40 and 41, is necessary to prevent water, above level 41 up to level 42 which is substantially the level of the "low pressure" pipe connection for the meter, from contacting the glycerine. This fluid can be either chloroform or carbon tetra-chloride mixed with gasolene or similar fluid to give the required specific gravity to maintain the fluid in the intermediate position; methyl salicylate has the proper specific gravity without mixing with other fluids; various other fluids or fluid mixtures obviously may be used for the same purpose. Dirt and rust sediment which normally enter the meter with the fluid under measurement—rust in water, dust in gas and similar foreign matter—which would normally settle on the mercury are retained in suspension either at the top of the glycerine level or at the top of the sealing fluid level.

Above the water level 42 the pressure chamber or meter housing 16 is filled with oil which is supported on the water in a manner to protect and lubricate the operating mechanism 4; in gas or airflow meters this oil can rest directly on top of the glycerine provided the pressure connection is above the oil level.

As pointed out mercury has been found to be most practical as a manometer fluid, fluid 2 for a variable contact element; however in some instances it is desirable to employ other fluids such as acids or acid mixtures and the like which are electrically conductive and may be used as conductive columns in a similar manner. Again nonconductive fluids may be employed such as oil and in some instances a solid member movable in response to variations of pressures or quantities to be measured.

Numerous adaptations for such variations will appear as falling within the scope of this invention. By way of example a solid body such as a float 43 as shown in Figure 8, having a well 44 therein of sufficient depth for a full range of the meter (about 1¼" for a 1" range meter) which well may be filled with mercury may be employed with either electrically conductive or insulating fluids and even in mercury, which floats, of course are constructed of materials of proper weight suitable for floats in the fluids in which they are employed. Such a float when its well is filled with mercury will maintain a central meniscus form of the character referred to in connection with float 25, particularly if it is amalgamated, and in a mercury column it will behave in very much the same manner as float 25. This float 43 is suitable for use with either conductive or nonconductive fluids, and in the event a nonconductive fluid is used, in addition to a contact tip 24, amalgamated, or saturated with the conductive fluid used in the well, a conductor member 45 may be carried by contact rod 1 but insulated therefrom for the purpose of providing an electrical circuit connection therewith. This conductor extends beyond tip 24 so as to be maintained in communication with the fluid in the well at all times or at least until contact tip 24 breaks circuit with the fluid.

Again in case a tip 46 of a contact rod 47 is to engage a solid member 48 which likewise constitutes a variable contact element as illustrated in Figure 9 this rod 47 which is similar in all other respects to contact rod 1, is provided with a thrust member such as a weighted ball 49 at its upper end. The operating mechanism 4 is provided with a slightly modified elongate frame 50 apertured at its lower end for slidingly receiving rod 47 and provided with a longitudinal guide way 51 in which weight 49 may slide. It will be noted that in this arrangement the adjustment may be such as to provide a positive contact similar to the "below zero plunge" of contact rod tip 24 in mercury,—that is when frame 50 is in its lowermost position the supporting lower end of the guide is spaced slightly (⅛") below weight 49 so that it is free to bear or force rod 47 with its contact tip 46 into engagement with the contact surface of member 48 with sufficient force to insure proper engagement therewith. In the event of a movement of members 48 such engagement of the contacting members will be maintained until the instant frame member 50 has been moved by the other parts of the operating mechanism 4 sufficiently to produce a break of contact therebetween.

Referring to Figure 1, it will be seen that pen arm 5 or indicator is employed with a chart 6 which is shown as a fragment of a circular chart and this chart is divided into arcs or circles indexed in percentages from 0% to 100% which is desirable in recording meters. Recordings of flow on such charts in proportional increments of flow instead of square of the flow by flow meters is particularly desirable for integrating as well as in telemetering practice.

The indicator or pen arm 5 is shown at the bottom of the scale, 0%, in the solid line position with the operating mechanism 4 and contact rod 1 at bottom stroke position and in dotted lines the pen arm or indicator is shown at 100% scale range, and parts of the operating mechanism 4 are indicated in dotted lines in this corresponding position. The sweep of the indicating or pen arm 5 is 45° on chart 6, as diagrammatically illustrated, upon which angle computations for measuremnts of the lever mechanism hereinafter described, are based. Since in practice some charts are formed for a half of that angle of recording pen arm sweep, as illustrated in Figure 5, the sweep of the pen arm 5 may be reduced accordingly by means of a reduction gear transmission comprising gears 52 and 53 for driving the pen through the smaller angle for operating on the upper part of the circular chart instead of the lower part as indicated in connection with chart 6 in Figure 1, with the same proportions of operating mechanism 4 which has advantages as will presently be described. The larger angle has an advantage in that a second indicator or pen arm 5a may be driven directly so as to plot low range deflections on another portion of the same chart and for such low scale deflections the angle may be multiplied by gearing in a similar manner for plotting still longer ordinates in recordings by the meter. Of course, the sweep of the pen arm for full range on the chart through a particular angular displacement of the upper lever may be accomplished by selecting the length of the pen arm and likewise the maximum on the chart may be reached for a smaller angular displacement of the upper lever if desired.

Operating mechanism 4 as arranged for converting various rises in heights of fluid 2 levels into square root indications or recordings on chart 6 comprises the elongate frame member 22 carrying contact rod 1, which together are longitudinally reciprocable in the rod guide 23 or an equivalent lower guide for the frame and an upper guide comprising slots 54 somewhat greater in length than its reciprocatory range in frame 22 which engage an oscillating sleeve 55 constituting the driving member for the indicator or pen arm 5. Roller element 17 of the operating lever mechanism is mounted on a pivot 56 secured or journaled in frame 22 so as to move upwardly and downwardly therewith. The roller element 18, which coacts with roller 17 and together constitute one of the operating levers during a measuring stroke of the meter is mounted on a pivot 57 mounted in an oscillatory bell crank member 58 which is integrally connected with sleeve 55 and constitutes the other cooperating lever element of the lever operating mechanism.

It will be noted that rollers 17 and 18 which coact in constituting one of the operating levers, are true circles, and, for convenience of the same size; however, by observing Figure 6 and comparing with Figure 5 it will be seen that a lever element 59 can be and may be substituted for these roller members; it will be noted that the lever mechanism is in the same intermediate driving position (approximately 60% of range) and that the proportionate lengths A and B of the lever arms are identical as to lengths which function to extract the square root of the fluid heights as will be explained hereinafter. For convenience the upper and lower lever members will be referred to as levers A and B respectively.

Referring to Figure 1 again, it is sometimes desirable to hold one of the rollers 17 or 18 against turning and for this purpose a roller locking element 60 is shown holding roller 18 in a non-rotatable position. In this way the other roller 17 coacts with the same surface of roller 18 in the manner of a cam, and while for the purpose of extracting the square root this surface is truly circular. The arrangement provides for a cam otherwise shaped whereby other functions than the square root may be obtained in the operation of the meter, such variations being of importance in particular applications of the meter, notwithstanding the fact that in accordance with the principal feature of this invention is the provision of coacting levers bearing a constant relationship with each other which will extract the square root with mathematical exactness without employing correcting elements and operate in a meter with such precision as has been impossible heretofore.

For extracting the square root of varying heights of the level of fluid 2 in measuring tube 8 for a rise of 1" and an indicator swing of 45° levers A and B having lengths, for illustrative purposes, of 1.455" for A and 1.196" for B. Levers of such lengths have been employed and operate well within the range of tolerance for metering practice although for other ranges and angles levers of other lengths bearing the same ratio as to length with respect to each other operate in a similar manner for indicating and recording flow measurements and with even a higher degree of precision with levers of selected lengths.

It is to be noted that lever A swings upward with equal angular increments for equal flow range deflections but lever B following lever A swings outward varying increments; each of these levers takes up a varying proportion of the total displacements of the contact tip. Further noting that these displacements angles by the upper longer lever A are proportional, it is pointed out that their increments of displacement are less than half of the total required displacement and are functions of the versed sines of the angles of displacement of the upper lever member but the greater increments of displacements by the lower lever are of a continuously varying character since they are functions of the versed sines of the varying angles.

Versed sine displacements do follow the square root with quite close precision up to a ten degree angle after which the errors increase to prohibitive values rapidly. Therefore they are only useful through very small displacemnt angles for metering practices without employing forms of correcting means which in themselves are apt to introduce errors which detract from the accuracy of the instrument or meter and are altogether too faulty for use in a precision instrument.

It is due to the above limitation in the versed sine operation that I have evolved the new principal of a pair of levers in toggle arrangement and so proportioned as to extract the square root mechanically and with such exactness for the operation of meters with a definitely higher degree of precision. In practice it has been found that the square root levers having the illustrative dimensions set forth operate in recording flows with exactness up to and above the 90% range of the chart which corresponds to an angle greater than 40° of the A lever, and with only a slight error well within meter tolerances at 100% range. At 90% and below, the flow error is negligible and does not appear in so far as meter indications and recordings are concerned.

It is to be further noted that the above measurements are based for a range swing of 45° with a displacement of one inch in setting forth an example which is accommodated to present practices with one of the usual forms of clock operated meter charts, with an angle of 22½°, being adapted for the same by reduction gears as shown in Figure 5. Such reduction gears could be omitted in operating with the same levers by employing a displacement of .25" as a maximum (50% of range) instead of 1", or for a 1" displacement the dimensions of the levers would have to be proportionately increased, each four times the lengths stated. However, in order to conserve space it is preferable to employ the shorter levers which require less space and thereby provide for a more compact meter unit. Similarly the displacement angles for full range as well as the dimensions of the lever elements may be varied but in all instances the proportionate lengths of the levers remain a constant. These levers may be operated to raise or lower the contacting element as may be required to adapt them to the broader applications or other applications as typified in Figure 10. The longer lever is always angularly displaced proportional to the square root of lineal movement of the remote end of the shorter lever.

Levers A and B being toggle levers, drive by or through the upper lever A is convenient. Accordingly lever A of operating mechanism 4 as shown in Figure 1 is arranged to be driven; bell crank 58 comprising this lever has an arm 61 through which oscillatory movements are imparted thereto. A driving shaft 62 is journaled in oscillatory sleeve 55 and is provided with an arm 63 integral therewith having a contact roller member 64 on its outer end which is adapted to engage a contact surface 65 formed on bell crank lever arm 61 to swing it for a forward or measuring stroke of the meter.

Lever arm 61 is also formed with an abutment surface 66 which engages a stop 67 which is positioned or may be adjusted so that when it is engaged by the abutment surface 66 the pivotal axes of levers A and B will be in alignment, that is, the centers of driving shaft 62 and pivots 57 and 56 will all lie along the center line axis, designated 68, of contact rod 1 and frame 22. A spring element 69 secured to lever arm 61 functions with a spring 70 to return the lever to and maintain the parts in said relationship, with the frame 22 carrying contact rod 1 tensioned in an upward direction. Spring 70 is tensioned between an extension 71 of lever A of the bell crank lever and a lower portion of frame 22 to elevate the frame and contact rod 1 and maintain roller 17 in engagement with roller 18 during a measuring stroke of the meter. As a metering stroke progresses the tension of spring 70 decreases but the tension of spring 69 increases and on long strokes the tension of this spring is sufficient to overcome and release any locking action incident to the operation of the levers at such angles and thereby insure the return of the levers and contact rod to their initial positions, even to returning the shaft 62, though a cofunctioning return or reversible drive motor and lighter spring operation is preferable for that purpose. However, the energy stored in these springs functions to the useful purpose in stopping the driving operations and helping in reversing the motor driven shaft at the critical range recording points in metering operations.

As stated, lever element A, the bell crank 58 has an oscillatory stroke the length of swing of which is determined by the height of the mercury, fluid 2 in measuring tube 8, and as illustrated in Figure 1 for its maximum stroke for a full range recording on chart 6 (which its stroke movements determine) the roller element 18 is swung by the A lever element of the bell crank from position III to position IV. Roller 18 is of course a part of the B lever element, roller 17 constituting the coacting other part thereof during the measuring operations of the meter. Roller 17, however, is illustrated in three positions I, III, and IV of its upward movement for a full range recording on chart 6 and the roller 64 carried on arm 63 of drive shaft 62 is shown in four positions, I, II, III, IV for such a recording. It will be noted that frame 22 has an upwardly extending cam portion 72 which is engaged by roller 64 and so as to depress frame 22 and rod 1 so that its contact tip 24 has a below zero plunge, of about 1/8" or less. The amount of this plunge is determined by the extent of swing of drive shaft 62 in positioning roller 64 for position I which is determined by a stop 73 which may be adjustable and against which arm 63 abuts to determine the below zero plunge. During a measuring stroke drive shaft 62 swings roller 64 in a clockwise direction as it moves from position I to position II frame 22 and contact rod 1 rise and roller 17 rises from its corresponding position I to position III in engagement with roller 18 ready to coact therewith during the measuring stroke and contact tip 24 is at its proper position for the fluid 2 zero level. In order to avoid confusion, however, the parts below roller 17 are only shown in their initial position, with contact tip 24 in its below zero plunged position. During the interval following movement of roller 64 from position II there is a zero pause when contact tip 24 remains at its zero level position until roller 64 reaches its position III in contacting engagement with contact surace 65 at which time the measuring stroke of the meter begins. During the further movement of roller 64, frame 22, contact rod 1 with its contact tip 24, and roller 17 rise as a unit, roller 17 moving upwardly from position III following the outward swinging movement of roller 18 from the initial position III thereof for the duration of the stroke as determined by the elevation of the fluid 2 in the measuring column; the corresponding full scale range positions of rollers 17 and 18 contact roller 64 are each indicated IV.

Referring to Figure 6 it will be seen that the arrangement employing a link type of lever element 59 will function in the identical manner, the lever being formed at one of its ends with an elongated slot 74 to provide for the below zero plunge of contact tip 24. A spring 75 between the pivots 56 and 57 insures the proper coaction of the lever operating elements during a measuring stroke.

As disclosed both arrangements provide for a below zero plunge of the contact tip. However in the event it is desired to operate the meter with the contact detector element moving from indicator maximum or above maximum (a movement off scale corresponding to the below zero plunge) down to the fluid level, the mechanism can be materially simplified as the cam 72 is not required and can be omitted, likewise no relative movement between pivots 56 and 57 (in Figures 1, 2, 5 and 6) is required and thus the B lever element can be secured between these pivots thereby omitting lost motion, and in Figure 6 slot 74 and spring 75.

As shown in Figure 2 the indicator or pen arm driving sleeve 55 of bell crank lever 58 extends outwardly through a stuffing box or journal 76 preferably grease packed, and outside of the casing 16 is drivingly connected with the indicator or pen arm 5 in the manner set forth. In addition to the indicator, this sleeve having oscillatory movement proportional to the flow, as measured through the square root levers, is particularly adapted for direct operation of flow integrators and such an integrator is diagrammatically represented at 77. This integrator may be of the one way clutch type as fully disclosed in my Patent 1,951,797; its simplified adaptation to my present meter is clearly apparent.

Sleeve member 55 is preferably closed at its outer end to prevent leakage or the necessity of a fluid tight packing around drive shaft 62 if it were arranged to extend through this outer end of the sleeve instead of being journaled therein as shown. Further, the other end of drive shaft might be extended rearwardly through casing 16 to be motor driven but preferably as shown it is journaled in a trunnion 78. This arrangement provides for the proper positioning of bell crank lever 58 and the alignment of the two shaft members; drive shaft 62 and sleeve 55, is maintained by the front journal 76 and rear trunnion 78 with the intermediate sleeve bearing arrangement between them.

Reciprocatory plunger type motors such as disclosed in some of my patents referred to, the combination of a forward drive motor and a reverse return motor and other types of drivers have proven highly satisfactory for meters according to the present invention, but preferably for the operation of drive shaft 62, since the power required is very small, as shown, a self starting synchronous motor indicated at 79 may be employed. This motor is diagrammatically pictured as a reversible "Telechron" type of motor, which is employed because of its availability but for metering a synchronous motor is not essential. In general this "Telechron" type of motor includes an armature enclosed in an upwardly extending tubular casing 80 engaged by a pair of field members with field windings 81 and 82 which are arranged for reverse operations and will be termed "up" and "down" motors respectively. These parts are above a substantially fluid tight casing 83 which houses reduction gearing for operating its drive shaft 84, in either direction in accordance with the energization of the field winding selected, at a speed of 1 R. P. M.

While such a motor is susceptible of operation within the fluid chamber 16, motor 79 is shown positioned above it with its shaft 84 extending through a stuffing box 85 providing a journal which is preferably of the grease packed type to reduce friction on the shaft extending into the chamber where it is drivingly connected with drive shaft 62. This driving connection between shafts 84 and 62 is shown as comprising a pair of gears 86 and 87 which are of the proper ratio to drive shaft 62, and the indicator or pen arm 5 at any desired speed. Although high or low speeds of operation may be employed, of course as the speed is increased the driving power also must increase. In practice a reduction to half speed, ½ R. P. M. as afforded by gear 87 being twice the size of gear 86, has given excellent results in ordinate plotting on a chart 6 by the pen arm 5.

The control system for operating the meter is diagrammatically illustrated in Figure 3 wherein the source of power supply is the usual 60 cycles alternating current at 110 volts delivered to lines 88 and 89. These lines feed into a step down transformer 90 for supplying a low voltage for operating a relay 91 as controlled by a clock operated commutator 92, the clock mechanism of which also operates to drive the circular chart 6 with which the indicator or pen arm 5 cooperates in recording. Alternately, as disclosed in several of my prior patents, a low voltage direct current source as supplied by a few battery cells may be used in place of transformer 90, but this transformer is preferable as it is found satisfactory in the arrangement as disclosed and has the advantage that the necessity for a battery source is obviated.

The operating circuit for relay 91 is—from the low voltage source 90, by conductor 93 through the operating coil of relay 91, conductor 94, contact element 95 and segment 96 of commutator 92, thence through the frame structure as represented by grounds 97 and 98 to contact rod 1 and contact tip 24, through the mercury, fluid 2 which is insulated from the frame structure but electrically connected by conductor 99 back to source 90. Commutator 91 is shown as rotating in a clockwise direction with its segment 96 just having passed contact element 95 but relay 91 has been energized by the circuit as stated and its two armatures 101 and 102 (shown for simplicity), being actuated and engaging their inner contacts. Inner contact of armature 102 is connected with conductor 94. When this armature which is grounded to the frame as represented at 103 engages its inner contact it affords a parallel path to the frame and this maintains the circuit closed after segment 96 has passed contact element 95 until contact tip 24 breaks contact with the mercury, fluid 2.

When relay 91 is energized its armature 101 is in engagement with its inner contact as shown connected with a conductor 104. Armature 101 being connected by conductor 105 with line 88 power is applied thereby to conductor 104, through up field winding 81 of motor 79 and thence by conductor 106 to the other line 89 and thereby energizing motor 79 to effect an upward movement of contact tip 24 through operating mechanism 4.

As shown, the motor has been operating from the time the relay circuit was made by clock contact element 95 and segment 96 and has at the point shown elevated contact tip 24 to the zero position and roller 17 of the operating mechanism into engagement with roller 18 thereby placing them into coacting relation as B lever. Motor 79 will continue the up drive until contact tip 24 is raised to the contact breaking point with respect to the mercury fluid 2, level which is shown as having a rise in measuring tube 8.

At the instant of this break of contact of contact tip 24 and the mercury, the circuit of the low voltage power source 90 for energizing relay 91 is broken, relay 91 is deenergized, armatures 101 and 102 thereof are withdrawn from their inner contacts breaking the circuit through the up field winding 81 of motor 79, immediately stopping and reversing the operation of the motor by relay armature 101 being brought into engagement with its outer contact. The power from line 88 is then by way of conductor 105, relay armature 101 and outer contact thereof and conductor 107 connected therewith and a switch 108 in a closed condition in conductor 107 through the down field winding 82 of motor to conductor 106 and to the other line 89 to energize motor 79 to effect a return movement of drive shaft 62.

At the time of break of contact tip 24 with fluid 2, not only does motor 79 stop and reverse, but the stopping is assisted by friction of the parts stuffing boxes, etc., and cooperation of springs 69 and 70, particularly the latter in which accumulated energy is stored as bell crank lever 58 is swung during the operating stroke, and as motor 79 is operated in the reverse direction to return drive shaft 62, its arm 63 and roller 64 to initial position, I, these springs 69 and 70 cooperate in returning the elements of the operating mechanism to their respective initial positions and to give contact tip 24 its below zero plunge.

Armature 101 of relay 91 having opened and engaged its outer contact to effect the reverse operation of motor 79 remains in this position until segment 96 of clock operated commutator 92 again engages contact element 95 to energize relay 91 again to repeat the cycle at such intervals as may be desired, the commutator being designed with as many segments or to be driven at such speeds as may be required to effect the desired duration of such intervals. In the meantime the down field winding 82 of motor 79 is energized so as to return drive shaft 62 until arm 63 thereof engages stop 73 when motor 79 is stopped or stalled thereby until relay 91 is energized again which is entirely satisfactory. Although switch 108 can be arranged to be mechanically opened after arm 63 engages stop 73 if desired when ordinate plotting is arranged to take place at long intervals, in the case of motors such as set forth, I prefer that switch 108 remain closed and allow down field winding 82 to remain energized with the motor stalled for the time after its operation until relay 91 is energized again.

This meter, being a power operated meter, is particularly adapted for operating integrators as well as indicating and recording devices, and is likewise operable as a telemetering transmitter for driving any conventional type of power operated transmitter driven by sleeve 55 in the same manner as the indicator or pen arm 5 as shown in Figures 1 and 2. It is also operable for transmitting signal current impulses in number proportional to the indication or recording on the chart in the manner presently set forth, such impulses being present due to the alternating current employed when the meter is provided with a synchronous electric driving motor.

Operating the meter with such a synchronous motor 79 is advantageous in that the ordinates plotted are of timed duration directly proportional to the flow and thus the meter employing such a synchronous type of motor is adaptable as a telemetering transmitter and for this purpose a synchronous type motor is essential for transmitting alternating current impulses which are in phase with the motor operating the meter. Figure 4 diagrammatically illustrates a supplemental circuit whereby the duration of ordinate plotting may be detected and electrically transmitted. For this purpose contact surface 65 is electrically insulated from the remainder of bell crank 58 and provides an electrical contact element with which contact roller 64 cooperates; contact roller 64 carried by drive shaft 62 is thereby conductively connected with the metallic frame structure of the meter, but if desired this roller may also be carried in insulated relationship with respect to the other meter parts. Connections of the motor up winding 81 through relay armature 101 with lines 88 and 89 are the same as in Figure 3 disclosing the meter operating system connections in full and in Figure 4 connections for telemetering by the meter are added. These connections include—a conductor 109 connecting line 89 with contact roller 64; a conductor 110 connected with contact surface 65 and a conductor 111 connected with conductor 104; these latter two conductors 110 and 111 are transmission lines which lead from the meter to a receiver and operate to transmit timed current impulses the duration of which are directly proportional to the flow being measured by the meter. It will be observed that the current for such timed current impulses originates in the lines 88 and 89 which are supplied with the electric power for the operation of the meter. When the relay is energized its armature 101 engages the inner contact thereof thereby connecting line 88 with one of the telemetering transmission conductors 111 at the same instant the motor up winding 81 is energized and actuation of the meter operating mechanism 4 is initiated. At the time up motor has elevated contact tip 24 to its zero level and contact roller 64 engages contact surface 65, but not until the engagement of these contact elements, line 89 is connected through conductors 109 and those engaging contacts with the other telemetering transmission conductor 110 and at this instant both of these conductors 110 and 111 are energized for transmitting current impulses of timed periods and of durations or in numbers proportional to a function of the quantity measured over the lines to a receiver. This timed impulse is due to the fact that motor 79 operating the meter operates at a synchronous speed and the lever arm A of the square root levers is driven thereby so that the duration of its swing is directly proportional to the function of the quantity being measured which the angular swing of lever A indicates by the indicator or recording pen arm 5.

The duration of this impulse as well as the energization of winding 81 for driving motor 79 in its up direction is determined by the break of contact between contact tip 24 and fluid 2 which deenergizes the control relay so as to release its armatures and so that the circuit is broken by armature 101 being withdrawn from its inner contact.

By this arrangement these telemetering current impulses are of precision timed duration, and at timed intervals as determined by the clock mechanism of the meter. The fact that the synchronous driving motor 79 operates for an interval before the initiation of the telemetering impulse perfects the precision of the impulse duration since it gives the motor a chance to start and come to an even synchronous speed before this impulse and the measuring stroke of the pen arm (lever A) are initiated and thus the synchronous speed of the motor during this portion of the complete meter stroke—raising the contact tip from its zero plunge to zero and then the zero pause, succeeded by the measuring movement of lever A and recording pen arm.

The meter employing a synchronous power driving motor for producing ordinates of a precision timed duration is also applicable for telemetering operations of modified forms. Noting particularly that the meter is operated at timed intervals as well as the timing of the ordinate plotting, the time intervals between such ordinate plottings are also susceptible for transmission in telemetering and thereby various arrangements for transmitting telemetering currents or impulses may be resorted to.

In the arrangement as described, the indicator or pen arm is operated to record ordinates which arrangement is preferable for numerous operations by the meter as set forth. While the indicator or pen operating mechanism can be arranged for fine line operation or recording, the plotting of ordinates has numerous advantages particularly for precision recordings in that the tip ends of the recorded ordinates determine the flow measurement with greatest precision exactly the square root of the rise of the mercury in the measuring tube. The arrangement of parts is also such that recording of the mercury level rising from zero in the measuring tube of the manometer is preferable, that is with the pressure connection, or high pressure connection with the range tube instead of with the measuring tube of the manometer; obviously however the reverse of this operation is contemplated within the scope of this invention. In connection with such precision operation of the meter it is to be observed that the precision is made possible by several factors including the improvement of the fluid column and its adjustment to the zero of the instrument operating mechanism, the precision break of contact between the mercury and the amalgamated contact tip, and the operating mechanism for extracting the square root and the precision of its operation.

Figure 10:
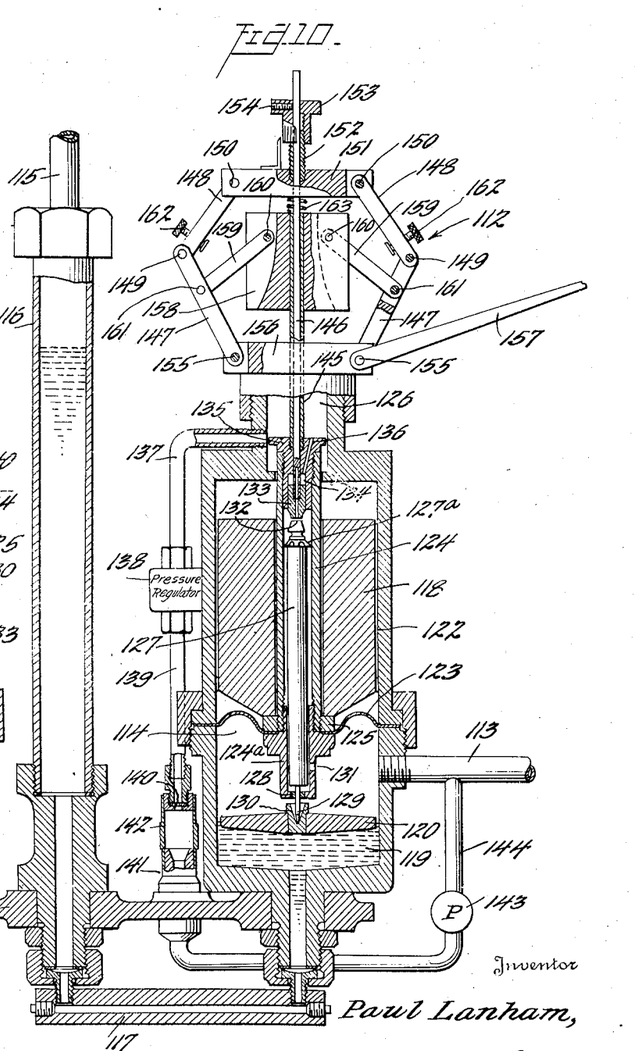
Figure 10 is a vertical sectional view of an improved mechanical type of meter with square root levers applied thereto in accordance with the invention.

In Figure 10 a practical application of operating mechanism 112 for extracting the square root of mercury deflections in the opposite direction is shown, that is with pressure applied through a pipe connection inlet 113, into the measuring tube or chamber 114 of the meter and a low pressure connection 115 is made with its range tube 116, with a pipe 117 providing a connection between the measuring chamber and range tube; altho this meter is also operable and has been operated satisfactorily with the higher pressure applied to the range tube. The arrangement disclosed is a modification and improvement over the mechanical manograph disclosed in my Patent 1,935,508 of November 14, 1933, and briefly one of the improvements consists in using a weight 118 which has the advantage over the arrangement disclosed in the patent since in that arrangement as the line pressure changes loss of head through the valve seat varies and that in turn causes a slight change in the valve opening even though there is no change in mercury level. While the line pressure remains constant or variations are slight the meter operates satisfactorily but for precision measurements in metering under varying pressure heads the weight 118 is provided which aided by a pressure regulator valve overcomes the above mentioned change of the valve opening. This may likewise be accomplished by means of a small recirculating pump in conjunction with an orifice or in place of the orifice and regulating valve. This pump is also of value for preventing waste of fluid under measurement particularly gasoline, gas and the like.

In general measuring chamber 114 and range tube 116 which communicate by way of connecting pipe 117 comprise a manometer which contains the operating fluid, mercury 119 and a float 120 thereon in the measuring chamber. The measuring chamber and range tube are shown mounted on a suitable form of base 121 for supporting the meter in a rigid, upright position. The range tube and connecting pipe elements in this instance may be amalgamated as heretofore set forth and varying types of range tubes or chambers may be employed. As shown range tube 116 is of smaller diameter than measuring chamber 114 and is particularly adapted for the meter in operating under high pressure differentials with the smaller variations of mercury depressions in the measuring chamber— that is, there may be a range of an inch to an inch and a half in the measuring chamber and in the range tube as much as a foot or more for operating under such high differential pressures. The parts are illustrated in a position approaching full range of mecury differential in measuring chamber 114 and range tube 116.

Weight 118 comprises a piston element which is reciprocable in a piston chamber 122 secured to and extending upwardly from the measuring chamber 114. In effect, chambers 114 and 122 are, combined, a measuring and piston chamber. However, while this piston could function as a sealing element along the walls of chamber 122, in order to improve the operation of the meter it is made freely slidable therein in a manner to permit fluid to pass between its outer surface and the side walls of the piston chamber. A sealing member 123 comprising a diaphragm is peripherally secured between the top edge of measuring chamber 114 and the lower edge of piston chamber 122. A central guide tube element 124 extends centrally from diaphragm 123 to which it is secured by a clamping element 125 cooperating with a tube extension member 124a upwardly through a central bore in weight 118, and guidingly terminated in a reduced upper chamber 126. Weight 118 rests on clamping element 125 and with tube element 124 and 124a is movable as unitary piston element.

Tube 124 provides a guide housing for a rod valve element 127, which rod valve element is heavy enough to overcome fluid pressures acting on it tending to maintain it in an elevated valve closing position. It is loosely-guided in tube 124, a collar 127a guiding its upper end and a reduced lower end portion extending through a strainless guide 128 centering the lower end of this rod and this lower reduced portion has a centering tip 129 which engages a cooperating recess 131 in the mercury float 120. Tube 124 is provided at its lower end extension 124a with one or more lateral apertures 131 whereby a fluid passageway is provided from measuring chamber 114 into tube 124 and along rod element 127 to the upper part of the tube. The upper end of rod 127 is provided with a flat valve surface 132 which cooperates with a valve element 133 slidingly fitted in a bore 134 in a head member 135 secured in the upper end of tube 124. Valve element 133 has fluid passage therethrough affording communication from tube 124 to the upper part of bore 134 of head member 135, and from this bore fluid can pass through one or more passages 136 into upper chamber 126; thence the fluid may pass around the head member 135 along the outer side of tube 124 into piston chamber 122, also from upper chamber 126 through conductor pipe 137, through a coupling member and pressure regulator valve 138 which is adjustable to reduce the pressure to a required lower constant pressure into pipe 139 and an orifice 140 of appropriate size for the operation of the meter. From orifice 140 the fluid or water spills into a drain pipe 141. A sleeve 142 providing a connection between orifice 140 and pipe 141 may be raised for inspection of the fluid flow through the orifice 140 during operation of the meter, but a sealed connection may be provided between pipes 139 and 141 and the fluid may be pumped back into measuring chamber 114 below diaphragm 123 by means of a pump 143 connected with pipe 141 and delivering the fluid through pipe 144 to inlet 113. In this case the pressure regulator 138 and orifice 140 may be dispensed with, and pump 143 is operated to circulate the proper amount of fluid to provide a proper pressure in piston chamber 122 with respect to the pressure in measuring chamber 114.

The piston elements, weight 118 and tube 124, are connected through head member 135 with a tubular extension 145 passing upwardly through a suitable stuffing box in the top of chamber 126, and a rod 146 is connected with valve element 133 and extends upwardly concentrically through tubular extension 145 and is suitably packed or has a fluid tight fit within this tube.

It will be seen that the water or other fluid pressure entering at 113 has a dual function. It determines or cooperates with the pressure in the range tube 116 in determining the mercury levels and thus the position of float 120, and also it passes upwardly through tube 124, through valve member 133 into chamber 126 and out through regulating valve 138 and orifice 140 where it spills or to pump 143 and back into inlet 113. The full pressure of the fluid acts on the lower side of weight 118 and diaphragm 123 tending to raise them. However the fluid pressure and weight 118 in chamber 122 oppose the effect of the fluid pressure under the diaphragm and determine the height weight 118 is raised which height is only sufficient to permit sufficient passage of water between the rod and its end surface 132 and valve element 133 to supply the fluid flow through orifice 140 to produce the required fluid back pressure in chamber 122 to maintain the weight in a balanced position. In the event the mercury 119 descends float 120 and valve rod element 127 also descend and more water is permitted to pass through valve element 133 to increase the fluid back pressure above the diaphragm and thus the weight descends to restore the balanced condition. Responsive to a rise of the mercury and the float 120 and surface 132 of rod 127 throttles fluid passage through valve element 133 decreasing the fluid back pressure above the diaphragm until weight 118 is elevated with valve element 133 to restore the balanced condition. It will be observed that the rod valve element 127 and float 120 follow the level of mercury 119 in the measuring chamber and these constitute a variably movable contact element and the cooperating valve element 133 constitutes the detector which has been found in practice to thus follow the movement of mercury in the measuring chamber with precision.

As just described valve element 133 and weight 118 move as a unit which condition actually exists when mutually locked. It is obvious, therefore that external portion of the tubular extension element 145, responds in the same magnitude to all changes and indicates all positions of the mercury 119 in chamber 114, particularly noting that it is the position of valve element 134 which determines the indications. A recorder responding to such movements of tubular rod element 145 plots or records true mercury positions which are proportional to the square of the flow in the usual operation of the meter in measuring fluid flow.

However, valve element 133 is arranged to slide in bore 134 whereby a slight movement of this valve element 133 by rod 146 with respect to tubular element 145 extending from the piston elements is afforded providing control mechanism for operating control mechanism 112, comprising square root levers of the type specifically described. These levers, being toggle levers, are preferably arranged in duplicate pairs on opposite sides of the control elements, extension tube 145 and rod 146 to compensate for lateral thrusts. The levers of each pair consist of a lower lever member 147 and an upper lever member 148 comprising respectively levers A and B which are mounted reversely of levers A and B as shown in other figures of the drawings. Lever elements 148, the B lever elements, are connected by means of pivots 149 with the A lever elements 147, and their upper ends are connected by pivots 150 to a cross head 151 secured to the upper end of rod 146 and thereby effect movement of valve element 133 in following the surface level of mercury 119 in measuring chamber 114 in the manner already described.

The connection between cross head 151 and rod 146 consists of a tubular extension 152 secured to the cross head and threaded at its upper end. An adjusting screw 153 on the threaded end of extension 152 is secured by means of a set screw 154 to rod 146, but before tightening this set screw rough adjustments of valve element 133 carried by rod 146 may be made. After set screw 154 is tightened adjusting screw 153, which is preferably graduated as a micrometer, may be turned, with the rod and valve element, on threaded extension 152 for a close adjustment and accurate positioning of valve element 133 and for calibration purposes.

The derivation from the operation as described is that weight 118 and other piston elements moving therewith have a slight relative movement with respect to valve element 133. While they are arranged to follow the movement of valve element 133 very closely, the slight movement of the piston elements with respect to the valve element adapts the piston element through their tubular extension 145 in the actuation of the operating mechanism 112 in obtaining a function of the movements of the mercury float as will be set forth.

The arrangement is such that long levers may be employed to advantage as will be seen, with the lower ends of the A lever elements 147 fixed with respect to the meter casing and extended as low thereon as desired. As shown these A levers have their pivots 155 supported in a cross member 156 mounted on the upper part of the casing and either or both of these pivots 155 may be driving elements for a transmitting unit of a conventional type. An indicator or pen arm 157 is shown mounted on one of the pivots 155 and is adapted to cooperate with a scale, and in recording makes fine line recordings directly proportional to the flow on a chart which may be of the type described. In this arrangement by using longer lever elements having the same relation of their lengths as particularly defined, the pen arm can be directly connected to the pivot member—these lever elements of course being of the proper lengths to provide for the maximum movements of the mercury 119 in measuring chamber 114.

The long levers also provide for smoother operation and opposite pairs may be spaced in this type of meter to provide for operating elements between them. These levers being toggle levers and having their pivots in a straight line in their zero position it is essential to apply an operating force for moving them out and into the zero position. The piston elements perform this function, not only at zero but throughout the range of the instrument. The piston elements in chamber 122 afford a powerful operating element for the upwardly extending tubular element 145 and outside of casing 122 this tube 145 carries a crosshead 158 which is in turn connected by links 159 at opposite sides to the square root levers. As shown, links 159 are connected by pivots 160 to crosshead 158 and by pivots 161 to the A lever elements 147, their length and other relations being such that there is only a slight relative movement of crossheads 151 and 158 with respect to each other, yet lever elements 147 and links 159 provide a connection which is capable of thrusting the lever elements outwardly or inwardly in all positions corresponding to the range movement of the members whenever there is a change in level of the mercury in the measuring chamber 114 which changes the balanced position of the piston elements backed by the power of the pressures in the measuring and piston chambers to effect the piston movement which is transmitted through crosshead 158 and links 159 to the square root levers. Thus valve member 133 is so positioned due to the square root lever effect that while it faithfully follows the varying mercury positions the pivots 155 are positioned exactly in agreement with the square root of this valve element position.

This meter as set forth is a powerful operating instrument particularly in moving the piston in its upward direction but due to stuffing box friction and the various driving operations between the piston element and levers, if the meter is to be employed for performing operations such as variably actuating control valves and the like it may be desirable to employ a heavier piston weight element or as shown crosshead 158 may be in the form of an added weight which is effective to increase the power of the meter. To facilitate calibration and in checking the zero position of the lever elements each pair of levers may be provided with stop element 162 which stops may be individually adjusted to proper positions for engagements with the sides of crosshead 158 so that the zero position of the levers can be fixed and departures therefrom detected.

It is to be observed that throughout the range of operation of the meter extension tube 145 follows the movement of rod 146 very closely in performing its function of actuating the A and B lever elements as disclosed, the greatest departure therefrom occurring substantially at mid range. That departure is very small and is due to the variation in lever length proportions as compared with the proportion of levers A and B with respect to each other, levers A and B being connected with rod 146. The interconnected lever arrangement affords smooth operation of the meter at all ranges including zero and maximum. However the operation is improved by employing spring elements, such for example as a compression type of spring 163 surrounding rod 146 and positioned between crossheads 151 and 158. Although this spring is under slightly greater compression at the lower and upper limits of range it facilitates operation both into and out of both of these range positions without altering or effecting the meter indications with respect to the positions of float 120. Further the spring actually improves the meter operation by always maintaining all the pivot connections of the lever members under stress and thereby prevents any variations of meter indications which might occur due to variations in fit of the pivots so that expensive pivot adjusting elements are not required and variations due to wear of these connections over long periods will not affect the accuracy of the meter.

In metering practice heretofore the use of cams for converting such pressure differentials as occur in manometers of the type described herein and other variable fluid heights or variable movable members into proportional flow measurements has been impractical for precision measurements. The rise of a cam at either low or high ranges is too steep for the operation of a follower directly moved by the cam. This difficulty has been overcome in accordance with the present invention by (1) driving through the levers A and B which are in a straight line at zero position by means of the motor driven arm 63 (Fig. 1), and (2) in operating through cam mechanism of the circular or roller type described herein or the aligned A and B lever elements which are equivalent thereof in this respect by means of operating mechanism (Fig. 10) wherein the actuation of the levers is effected through extension tube member 145 and associated parts as controlled by rod 146 which follows the movement of the variably movable member or fluid rises with precision.

I do not wish to limit myself to any of the specific constructions, measurements or modes of operation described above in this specification for purpose of giving examples or illustrations of employment of the invention, for it will be obvious that wide departure from the above may be made without departing from the spirit and scope of my invention which is as set forth in the following claims.

I claim:

1. A meter including an indicator, a movable contact element variable with a quantity to be measured, a detector for cooperating with said contact, power operating means for moving the indicator limited by the movement of the detector, and interacting operating means between said power means and the detector for squaring the motion of the indicator and operating the detector in accordance with said squared movement.

2. A meter including an indicator, a movable contact element variable with a quantity to be measured, a detector for cooperating with said contact, power operated means for moving the indicator limited by the movement of the detector, interacting operating means between said power means and the detector for squaring the motion of the indicator and operating the detector in accordance with said squared movement, and means for moving the detector beyond the range of movement of the movable contact without moving the indicator.

3. A flow meter including an indicator, a movable contact element variable with the flow differential pressures of a quantity to be measured, a detector for cooperating with said contact, a pair of lever elements coacting between the indicator and detector for controlling the movements thereof so that when the detector is moved in proportion to the differential pressure of the quantity the indicator will be moved substantially in linear proportion to the flow of the quantity, power means for operating the indicator directly and the detector through said lever elements, and means for controlling the operation of the indicator by the power means in accordance with the positions of the movable contact element as determined by the detector.

4. A meter for indicating a function of a quantity including, a contact variably movable in accordance with the quantity to be measured, a reciprocatory detector cooperating with said movable contact, driving means for operating said detector in either direction, an operating connection associated with the driving means and said detector for operating an indicator, time controlled means for effecting movement of the detector in one direction by said driving means, and means to effect a reversed movement of the detector by said driving means when the detector breaks contact with the movable contact.

5. A meter including an indicator for indicating a function of a quantity to be measured, a fluid column movable responsive to the quantity, a detector cooperating therewith to detect movements of the fluid column, operating means for reciprocably moving the detector and effecting indications of the indicator, a reversible motor operable to drive the operating means through a forward movement of the detector, and means for reversing the drive of said motor at the instant the detector breaks contact with the fluid column for effecting a return of the detector to its initial lowermost position in the fluid column.

6. A meter including an indicator for indicating a function of a quantity to be measured, a fluid column movable responsive to the quantity, a detector cooperating therewith to detect movements of the fluid column, operating means for reciprocably moving the detector and effecting indications of the indicator, a reversible motor operable to drive the operating means through a forward movement of the detector, means for reversing the drive of said motor at the instant the detector breaks contact with the fluid column for effecting a return of the detector to its initial position in the fluid column, and means for initiating driving operations of the motor for forward movements of the detector at timed intervals.

7. A meter including a contact variably movable in accordance with a quantity to be measured, a detector contact reciprocable with respect to said variably movable contact, an element for indicating a function of the quantity to be measured, and means for moving the indicating element corresponding with the range of the function of the value to be measured and for moving the detector throughout the range and below a point corresponding to the zero value of range measurements.

8. A meter for indicating a function of a quantity represented by movements of a fluid, including the combination with a reciprocatory detector element, of means for adjusting the relation of the fluid and detector with respect to each other, and an element for temporarily coacting with the detector to effect an artificial indication of the meter during an adjustment for calibration thereof.

9. A meter for indicating a function of a quantity represented by movements of a fluid, including the combination with a reciprocatory detector element, of means for adjusting the relation of the fluid and detector with respect to each other, and an element for coacting with the detector temporarily displacing the detector to effect an artificial indication of the meter during an adjustment for calibration thereof.

10. A meter for indicating a function of a quantity represented by movements of a fluid in a manometer or the like, including the combination with a detector member coacting with respect to the fluid in the manometer, of a fluid flow control member in the manometer, and means to periodically operate said control member for controlling the flow of the fluid in said manometer.

11. In a meter for indicating a function of a quantity represented by the movement of a fluid column, a detector member coacting therewith and movable into and out of the fluid column, and a thermal element connected with the detector to vary its position to compensate for expansion and contraction affecting the relation of the detector with respect to the fluid column due to temperature variations.

12. In a meter for indicating a function of a quantity represented by movements of mercury in a manometer or the like, said manometer characterized by having a part of its internal surface amalgamated so as to provide a uniform meniscus of the mercury at its surface in the measuring chamber and substantially frictionless travel of the mercury through the manometer as it is displaced subject to varying forces acting on it effecting movement thereof to be detected, and means cooperating with the mercury in the manometer for detecting movements thereof.

13. A meter including a movable fluid column, a detector cooperating therewith to detect movements of the fluid column by breaking contact therewith, means for reciprocating said detector in the fluid column, and stabilizing means for effecting a constant and uniform formation of the fluid surface at the time the detector breaks contact therewith comprising a displacer reciprocated with the detector in the fluid column being withdrawn therefrom ahead of the time the detector breaks contact with the column.

14. A meter including an indicator, a fluid column movably responsive to the quantity, a detector cooperating therewith to detect movements of the fluid column, operating means for moving the detector with respect to the fluid column and effecting operations of the indicator, and stabilizing means for effecting a constant and uniform formation of the fluid surface at the time of detection thereof, including a float centrally positioned on the fluid column and a displacer cooperating with the detector to produce a relative movement of the fluid with respect to the detector.

15. In a meter for indicating a function of a quantity represented by the movement of a fluid column, a detector member coacting therewith and movable into and out of the fluid column, and a fluid displacer attached to and coacting with the detector so as to reciprocably move with the detector into and out of the fluid column during the operation of the meter.

16. In a meter for indicating a function of a quantity represented by movements of an electrically conductive fluid in a column or the like, a detector element cooperable with the fluid for detection of movements thereof by breaking electrical contact with the surface of the fluid, operating means associated therewith for effecting indications of the meter, and a float carried by the fluid having a bore through which said detector element can freely cooperate with the fluid for electrical contact directly with the fluid in the column.

17. In a meter for indicating a function of a quantity represented by movements of mercury in a column or the like, an element cooperable with the mercury for detection of movements thereof, operating means associated therewith for effecting indications of the meter, and a float carried by the mercury having a bore through which said detector element can freely cooperate with the mercury for electrical contact direct with the mercury in the column, said float characterized by having a part of its surface amalgamated so as to form a stable meniscus at the contacting point.

18. In a meter for indicating a function of a quantity represented by movements of a fluid column, a detector, operating means associated with the detector for reciprocating it and effecting indications of the meter, a member in the form of a float movable in accordance with the quantity being metered, said member having a well therein for retaining fluid constituting a fluid column in which the detector is reciprocably moved by said operating means, and means for determining the length of such reciprocations in the fluid column by the breaking of the contact of the detector with the column.

19. A flow meter including an indicator, a fluid chamber having a fluid column therein variable with the flow differential pressures of a quantity to be measured, a float on said column movable therewith, power operating mechanism including an operating piston, means for controlling the fluid flow from said chamber responsive to variations in the height of the fluid column for controlling the operation of said piston, said control means comprising valve means controlled by the float for permitting a discharge of fluid from the chamber for controlling the pressure acting on the piston for effecting movement of the piston, interconnected operating means between said valve means and the indicator whereby the indicator will be moved directly in proportion with the fluid flow of the quantity being measured, and a connection between the interconnected operating means and said operating piston whereby the piston will have a movement varying from the movement of the fluid column by the fluid pressure acting on it but is operable to move the valve means directly in accordance with the movement of the fluid column so that the indicator will give flow indications corresponding with the flow of the quantity being measured.

20. A meter including an indicator, a member variably movable with a function of a value to be measured, operating mechanism including a fluid chamber with a co-extensive piston chamber, a weight outside of said chambers for operating the indicator in one direction, a piston weight within the piston chamber cooperating with the weight outside of said chambers, a diaphragm connected to said fluid chamber and supporting said weights so that a portion thereof supporting said weights may be variably moved with respect to the chamber, means for admitting pressure to said diaphragm for moving both of said weights and the indicator in the other direction, valve means controlled in accordance with the movement of the variably movable member for controlling the pressure acting on the diaphragm for effecting movement thereof in accordance with the movement of the variably movable member, and inter-connected operating means between the weights and valve means for controlling the position of the valve means in cooperation with the movement of the variably movable member.

21. An instrument having in combination a fluid pressure chamber and movable piston means in said chamber acted upon by fluid pressures therein, said piston means dividing said chamber into two pressure compartments, means for admitting fluid pressure into one of said compartments, a variable orifice connecting the latter with the second compartment, a fixed orifice in the second compartment, a fluid regulator in communication between the second compartment and said fixed orifice to maintain a uniform fluid pressure on the orifice, a member responsive to variations in the value to be measured for controlling the effective area of said variable orifice thereby varying the pressures acting on said piston means, and an indicator operated by said piston means as it moves in response to the variable pressure exerted thereon.

22. An instrument having in combination a fluid pressure chamber and movable piston means in said chamber acted upon by fluid pressures therein, said piston means dividing said chamber into two pressure compartments, means for admitting fluid pressure into one of said compartments, a variable orifice connecting the latter with the second compartment, a pump connected between said compartments operable to continuously withdrawn a predetermined quantity of fluid from the second compartment and return it to the first compartment to maintain a fixed relation of pressures on opposite sides of the piston means when the piston means is positioned in accordance with the quantity being measured, a member responsive to variations in the value to be measured for controlling the effective area of said variable orifice thereby varying the pressures acting on said piston means, and an indicator operated by said piston means as it moves in response to the variable pressures exerted thereon.

23. In a flow meter including an indicator, a member variably movable in response to differential pressures resulting from the flow of a quantity to be measured, a detector for cooperation therewith, interacting means associated with the detector and indicator for effecting movement of the detector in accordance with the movement of the variably movable member and moving the indicator directly proportional to the flow of the quantity being measured, and power means controlled by movement of the variably movable member in cooperation with the detector for effecting the actuation of said interacting means and thereby through the interacting means effecting the corresponding movements of the indicator and detector.

24. A meter for measuring the position of a movable member, including an indicator and a detector for cooperating with the movable member, a pair of lever elements providing coacting means between the detector and the indicator, power means for operably moving the lever elements with respect to each other in accordance with movements of the movable member continuously controlling the movement of the lever elements throughout the range of the meter during the operation thereof, said power means for moving the lever elements including a rotary driving element operable on one of the lever elements for moving both lever elements in accordance with all positions of the movable member and means for controlling said power means in accordance with movements of the detector with respect to the movable member.

25. A meter for measuring the position of a movable member for a range of movement from a zero position to a determined maximum, said meter including a detector for cooperating with the movable member and an indicator for indicating a function of the movement of the movable member, means for operating said indicator to indicate the function of the movement of the movable member including a pair of coacting lever elements between the indicator and detector, said lever elements connected for movement from a straight line position to any buckled position with respect to each other incident to the movements of the movable member, power means acting on said lever elements for operably moving them into and out of various positions with respect to each other to positions corresponding to the positions of the movable member, and means for controlling the actuation of said lever elements by said power operated means in accordance with the position of the movable member in cooperation with the detector throughout the entire range of the meter.

26. A meter for measuring movements of a movable member from a zero position throughout its range of movement, including indicating means, detecting means for detecting movements of the movable member, actuating means for moving the detector in accordance with movements of the movable member and for moving the indicator with modified movements with respect to movements of the movable member, power means for operating said detector and indicator actuating means throughout the entire range of the meter, means for controlling said power means in accordance with the positions of the movable member as determined by the detector, and means operated by the power means to give the detector an additional movement below the zero position of the movable member.

27. A meter for measuring the position of a movable member including an indicator for indicating functions of movements and a detector for detecting positions of the movable member, interacting means between the indicator and detector comprising a pair of coacting lever elements arranged in a straight line in the zero range position of the movable member and in angular positions with respect to each other corresponding to movements of the movable member from the zero range position, power means continually operable on said lever elements to move them from their straight line zero position and to all other positions of the lever elements with respect to each other throughout the range of the meter during the operation thereof, and means for controlling said power means in accordance with the position of the movable member as determined by the detector.

28. A meter for measuring the position of a movable member including an indicator for indicating functions of movements and a detector for detecting positions of the movable member, and interacting means between the indicator and detector comprising a pair of lever elements one of which lever elements has a circular contact surface whose center is located at a predetermined distance from the pivoting point of the lever, and the other of which lever elements also includes a circular contact surface for coacting with the circular contact surface of the first said lever element.

29. A meter for measuring a function of a quantity represented by movements of mercury, including an indicator, a manometer comprising a measuring chamber and a range tube communicating therewith, said manometer characterized by having a part of its internal surface including its range tube amalgamated so as to provide a uniform meniscus of the mercury at its surface in the measuring chamber and substantially frictionless travel of the mercury through the manometer as it is displaced subject to varying forces acting on it effecting movement thereof to be detected, said manometer having mercury therein and a float on the mercury in the measuring chamber, and interacting means between the float in the measuring chamber and the indicator operable on the indicator to effect indications thereof corresponding with the positions of the mercury in the measuring chamber of the manometer.

30. A meter including an indicator for indicating a function of a quantity to be measured, a contact movable in accordance with the quantity to be measured, a detector for cooperating with said movable contact, inter-operating means between the indicator and detector whereby when the indicator is moved the detector will be moved in accordance with the square of the movement of the indicator, electric power operating means for actuating the indicator and translating movement through said inter-operating means between the indicator and detector for operating the detector with a corresponding functional movement, and means for controlling the operation of the indicator by said electric power means in accordance with movements of the movable contact as determined by the detector.

31. A meter including an indicator for indicating flow measurements represented by differential pressures of a quantity to be measured, a contact movable in accordance with the quantity to be measured, a detector for cooperating with said movable contact, inter-operating means between the indicator and detector whereby when the indicator is moved the detector will be moved in accordance with a function of the movement of the indicator, said interoperating means including a pair of lever elements coacting between the indicator and detector for controlling the movements thereof so that when the detector is moved in proportion to the differential pressure of the quantity the indicator will be moved substantially in linear proportion to the flow of the quantity, power operating means for actuating the indicator and translating movement through said interoperating means between the indicator and detector for operating the detector with a corresponding functional movement, and means for controlling the operation of the indicator by said power means in accordance with movements of the movable contact as determined by the detector.

32. The combination in a meter including an indicator, a contact movable in accordance with a quantity to be measured, and a detector reciprocably movable for cooperating with said movable contact, of inter-operating means between the indicator and detector operable to translate progressive movements of the indicator into movements functionally related thereto in accordance with an exponential power for moving the detector, power operating means applied to the indicator end of the inter-operating means for driving said inter-operating means adapted to operate the indicator directly therewith and translate movement through said inter-operating means for driving the detector imparting exponential functionally related movements thereto, and means for controlling the movements of the indicator by the power operating means in accordance with the positions of the movable contact member as determined by the detector.

33. The combination in a meter including an indicator, a contact movable in accordance with a quantity to be measured, and a detector reciprocably movable for cooperating with said movable contact, of inter-operating means between the indicator and detector comprising a pair of coacting lever elements such as a pair of coacting cams, one of which lever elements is mounted for angular movement about a fixed pivot axis and with which the indicator is associated, and the other of which lever elements coacting with the first lever element has a connection with the detector for reciprocably moving it, power means for driving the first lever element and adapted to operate the indicator directly therewith and to thereby drive the detector connected with the second coacting lever element, and means for controlling the movements of the indicator by the power means in accordance with the positions of the movable contact as determined by the detector.

34. In a meter for indicating a function of a fluid quantity to be measured represented by movements of a mercury fluid column as affected by said fluid quantity, a detector having a contact tip at its lower end, operating means associated with the detector for vertically reciprocating it in said fluid column and effecting indications of the meter, means for determining the length of such reciprocations in the fluid column by the breaking of contact of the detector tip with the column, and shielding means on the detector above the contact tip limiting the amalgamable area of the contact tip said detector having its contact tip amalgamated whereby continuous breaking contact with the mercury in the column can be had with precision accuracy of the measurements of such breaks.

35. In a meter for indicating a function of a fluid quantity to be measured represented by movements of a mercury fluid column as affected by said fluid quantity, a detector having a contact tip at its lower end, operating means associated with the detector for vertically reciprocating it in said fluid column and effecting indications of the meter, means for determining the length of such reciprocations in the fluid column by the breaking of contact of the detector tip with the column, said detector having its contact tip amalgamated whereby continuous breaking contact with the mercury in the column can be had with precision accuracy of the measurements of such breaks, shielding means on the detector above the contact tip limiting the amalgamable area of the contact tip, and a protective fluid maintained in direct contact between the fluid quantity being measured and the surface of the mercury having a depth over the mercury greater than the amount the amalgamated detector contact tip rises above the mercury column when the detector tip breaks contact with the mercury of the column.

PAUL LANHAM.